(12) United States Patent
Chen et al.

(10) Patent No.: US 9,612,678 B2
(45) Date of Patent: Apr. 4, 2017

(54) TOUCH DISPLAY SCREEN AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaochuan Chen, Beijing (CN); Hailin Xue, Beijing (CN); Lei Wang, Beijing (CN); Yanna Xue, Beijing (CN); Chuncheng Che, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 216 days.

(21) Appl. No.: 14/384,997

(22) PCT Filed: Dec. 20, 2013

(86) PCT No.: PCT/CN2013/090025
§ 371 (c)(1),
(2) Date: Sep. 12, 2014

(87) PCT Pub. No.: WO2015/043095
PCT Pub. Date: Apr. 2, 2015

(65) Prior Publication Data
US 2016/0195972 A1    Jul. 7, 2016

(30) Foreign Application Priority Data

Sep. 29, 2013 (CN) .......................... 2013 1 0456437

(51) Int. Cl.
*G06F 3/041* (2006.01)
*G02F 1/1333* (2006.01)
(Continued)

(52) U.S. Cl.
CPC ........ *G06F 3/0416* (2013.01); *G02F 1/13338* (2013.01); *G06F 3/044* (2013.01);
(Continued)

(58) Field of Classification Search
CPC ........... G06F 2203/041; G06F 3/03547; G06F 3/041; G06F 3/0412; G06F 3/0414;
(Continued)

(56) References Cited

U.S. PATENT DOCUMENTS 7,724,232 B2    5/2010 Moon
2005/0206637 A1    9/2005 Takahashi et al.
(Continued)

FOREIGN PATENT DOCUMENTS

CN    1674084 A    9/2005
CN    101620838 A    1/2010
(Continued)

OTHER PUBLICATIONS

First Chinese Office Action dated Nov. 11, 2015; Appln. No. 201310456437.1
(Continued)

*Primary Examiner* — Rodney Amadiz
(74) *Attorney, Agent, or Firm* — Ladas & Parry LLP (57) ABSTRACT

Embodiments disclose a touch display screen and a driving method thereof, which relates to a field of display, capable of decreasing a thickness of a panel and a width of the bezel and reducing a cost. The touch display screen according to the embodiments of the present disclosure comprises a color film substrate and an array substrate, wherein common electrodes, which has a shape of strip, are disposed on the
(Continued)

color film substrate or the array substrate, one or more of the common electrodes act as a touch driving electrodes; the touch display screen further includes: a driving circuit, connected with the common electrodes acting as the touch driving electrodes, for applying touch driving pulses to the common electrodes acting as the touch driving electrodes and applying a common voltage in a period during which no touch driving pulse is applied.

18 Claims, 6 Drawing Sheets

(51) Int. Cl.
  *G06F 3/044* (2006.01)
  *G09G 3/36* (2006.01)
(52) U.S. Cl.
  CPC ......... *G06F 3/0412* (2013.01); *G09G 3/3677* (2013.01); *G09G 2310/0286* (2013.01)
(58) Field of Classification Search
  CPC ...... G06F 3/0416; G06F 3/0418; G06F 3/046; G06F 3/047; G06F 2203/04107; G06F 2203/04111; H05K 9/0073; H05K 9/0079; H05K 9/0081; H05K 9/0088
  USPC ............... 344/173–174; 178/18.01–18.11
  See application file for complete search history.

(56) References Cited

U.S. PATENT DOCUMENTS

| | | |
|---|---|---|
| 2010/0277444 A1 | 11/2010 | Lee et al. |
| 2012/0154322 A1 | 6/2012 | Yang et al. |
| 2014/0002410 A1* | 1/2014 | Lillie ................ G06F 3/041 345/174 |
| 2014/0022465 A1* | 1/2014 | Wu ................ H03K 17/9622 349/12 |
| 2014/0092079 A1 | 4/2014 | Xu et al. |
| 2016/0195972 A1* | 7/2016 | Chen ................ G02F 1/13338 345/173 |

FOREIGN PATENT DOCUMENTS

| | | |
|---|---|---|
| CN | 102200857 A | 9/2011 |
| CN | 102375589 A | 3/2012 |
| CN | 102903720 A | 1/2013 |
| CN | 103226423 A | 7/2013 |
| CN | 203149548 U | 8/2013 |
| JP | 2008-003618 A | 1/2008 |

OTHER PUBLICATIONS

First Chinese Office Action dated Oct. 10, 2015; Appln. No. 201310300692.7.
International Preliminary Report on Patentability dated Mar. 29, 2016; PCT/CN2013/090025.
International Search Report dated Sep. 6, 2014; PCT/CN2013/090025.
Chinese Patent Certificate; Appln. No. ZL 2013 1 0456437.1 dated Oct. 5, 2016.

* cited by examiner

TOUCH DISPLAY SCREEN AND DRIVING METHOD THEREOF

TECHNICAL FIELD

The present disclosure relates to a field of display, and more particularly, to a touch display screen and a driving method thereof.

BACKGROUND

A touch display screen has been developed rapidly. Most of current mainstream products utilize a structure design with an Add-on touch screen, but the traditional Add-on touch screen is thick and heavy in its entire structure and has a high cost; therefore an In Cell touch screen becomes an important development in a field of a touch display as consumers desires the display to be thinner.

Figure 8:
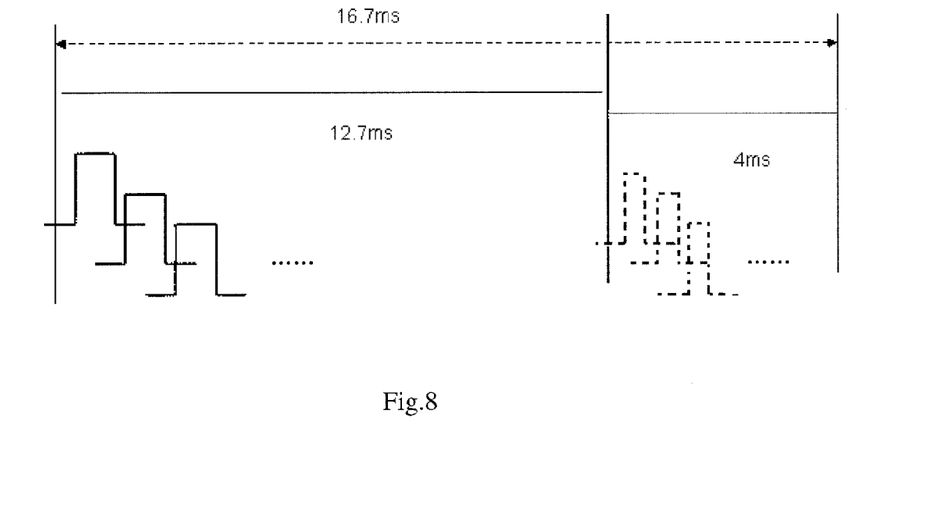
FIG. 8 is a timing diagram of a touch display screen driven in time-division as known.

The In Cell touch display screen generally refers to a structure in which both driving electrodes and sensing electrodes are disposed inside a liquid crystal box. In an existing In Cell touch display screen (thereafter, called as a touch display screen), a touch detection function and a display function share common electrodes generally, therefore a manner in which the touch detection function and the display function operate alternatively temporally is generally utilized in order to prevent a display effect of a picture from being affected by changes in a touch voltage. That is to say, the touch display screen is driven in time-division, for example, as illustrated in FIG. 8 in which a solid line denotes gate driving signals and a dotted line denotes touch driving signals, a product of 60 Hz is driven in time-division, so that a period about 12 ms is used for displaying and a period about 4 ms is used for performing the touch function during a frame period of time, 16.7 ms. Although the signals are changed, human's eye can not perceive such change, so it is called as a time-division driving. The touch display screen driven in time-division only can perform the touch detection within a very short period (the period used for performing the touch function), such that the report rate, that is, a number of times of reporting touch point information per second, is low.

SUMMARY

Embodiments of the present disclosure provide a touch display screen and a driving method thereof which are capable of increasing the report rate.

In view of this, embodiments of the present disclosure utilize solutions as follows.

A touch display screen comprises a color film substrate and an array substrate, where common electrodes, which have a shape of strip, are disposed on the color film substrate or the array substrate, and one or more of the common electrodes act as touch driving electrodes; the touch display screen further comprises:

a driving circuit, connected with the common electrodes acting as the touch driving electrodes, for applying touch driving pulses to the common electrodes acting as the touch driving electrodes and for applying a common voltage in a period during which no touch driving pulse is applied.

Optionally, the driving circuit comprises a plurality of shift registers;

an outputting terminal of each shift register is connected with one of the common electrodes acting as the touch driving electrode, except for a first shift register and a last shift register, the outputting terminal of each of shift registers is connected with an inputting terminal of a subsequent shift register adjacent thereto and a reset signal inputting terminal of a previous shift register adjacent thereto, an inputting terminal of the first shift register inputs a frame start signal, an outputting terminal of the first shift register is connected with an inputting terminal of a second shift register, and an outputting terminal of the last shift register is connected with a reset signal inputting terminal of a previous shift register adjacent thereto and its own reset signal inputting terminal, and a low voltage signal inputting terminal of each of shift registers inputs the common voltage.

In an example, the touch display screen further comprises touch sensing electrodes disposed on the color film substrate.

In an example, the touch display screen comprises a plurality of display units, and one of the common electrodes corresponds to one or more rows of the display units.

Optionally, the common electrodes are disposed on the array substrate.

Optionally, the common electrodes are slit electrodes.

Optionally, the driving circuit is disposed on the array substrate.

Optionally, the inputting terminal of the first shift register inputs the frame start signal, as a touch scan initiation signal.

The embodiments of the present disclosure further provide a driving method of a touch display screen, comprising:

applying a touch driving signal to a touch driving electrode corresponding to a display unit of the touch display screen, during a first period before a display signal is applied to the display unit; and applying the display signal to the display unit, while applying a common voltage to the touch driving electrode corresponding to the display unit.

An implementation of the above driving method is as follows.

when a frame of display signal is applied, the touch driving signal is applied to the touch driving electrodes corresponding to the $1^{st}$~Kth rows of display units of the touch display screen one by one at first;

next, starting from the $1^{st}$ row of display units of the touch display screen: when the display signal is applied to the Nth row of display units of the touch display screen, the common voltage is applied to the touch driving electrode corresponding to the Nth row of display units and at the same time the touch driving signal is applied to the touch driving electrode corresponding to the (N+K)th row of display units, and so forth, until the display signal is applied to the Kth row of display units from the bottom of the touch display screen; when the display signal is applied to one of last K rows of display units of the touch display screen, the common voltage is only applied to the touch driving electrode corresponding to the display units;

wherein the Nth row of display units and the (N+K)th row of display units do not correspond to a same touch driving electrode, both N and K are nature numbers, and N≥1, K≥1.

Optionally, in the driving method, during a time period of one frame, the touch driving signal is applied to the touch driving electrode corresponding to any one row of display units once.

Optionally, during the time period of one frame, after the common voltage is applied to the touch driving electrode corresponding to any one row of display units, the common voltage is maintained until the touch driving signal is applied; and after the touch driving signal is applied to the touch driving electrode corresponding to any one row of display units, the touch driving signal is maintained until the common voltage is applied.

In the touch display screen and the driving method thereof according to the embodiments of the present disclosure, the common electrodes are configured as strips, a part or all of the common electrodes are selected to act as the touch driving electrodes, and the driving circuit connected with the touch driving electrodes (the common electrodes acting as the touch driving electrodes) not only can apply the touch driving pulses to the touch driving electrodes, but also can apply the common voltage during the period in which no touch driving pulse is applied. For any one common electrode acting as the touch driving electrode, in the time period of one frame for displaying, the remaining period is for maintaining the common voltage except for the duration for the touch driving pulse. Therefore the duration for the touch driving pulse can be extended, so that the report rate of the touch display screen is increased.

BRIEF DESCRIPTION OF THE DRAWINGS

In order to explain solutions in embodiments of the present disclosure more clearly, drawings required as describing the embodiments of the present disclosure will be introduced briefly below. Obviously, the drawings described below only illustrate some embodiments of the present disclosure, but those ordinary skilled in the art may obtain other drawings according to these drawings without paying any inventive labors.

FIG. 5(*a*) is an exemplary view illustrating a structure of a shift register according to the embodiments of the present disclosure;

FIG. 5(*b*) is a driving timing diagram of the driving circuit including the shift register shown in FIG. 5(*a*);

REFERENCE SIGNS

10—array substrate, 11—pixel electrode, 12—common electrode, 13—data line, 14—gate line, 15—driving circuit, 16—driving chip, 20—color film substrate, 21—touch sensing electrode, 22—color film layer

DETAILED DESCRIPTION

Thereafter, solutions of embodiments of the present disclosure will be described clearly and completely in connection with drawings of the embodiments of the present disclosure; obviously the described embodiments are only some, but not all of the embodiments of the present disclosure. Any other embodiments obtained by those ordinary skilled in the art based on the embodiments of the present disclosure without paying inventive labors should fall into a scope sought for protection in the present disclosure.

Figure 1:
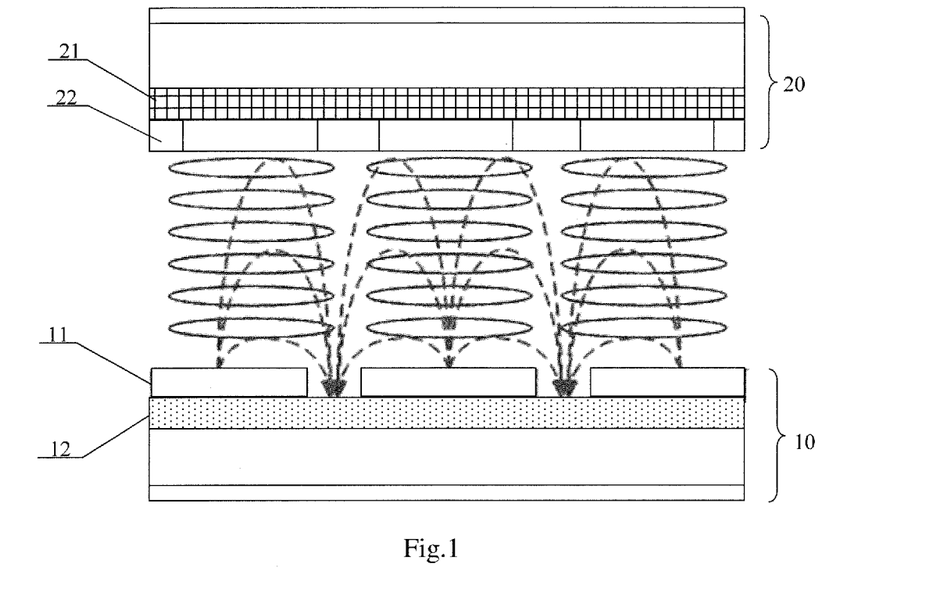
FIG. 1 is an exemplary view illustrating a structure of a touch display screen according to embodiments of the present disclosure.

The embodiments of the present disclosure provide a touch display screen, as illustrated in FIG. 1, comprising a color film substrate 20 and an array substrate 10, wherein common electrodes 12, which have a shape of strip, are disposed on the array substrate 10, and one or more of the common electrodes 12 act as touch driving electrodes; the touch display screen further comprises: a driving circuit (not shown in FIG. 1), connected with the common electrode 12 acting as the touch driving electrode, for applying a touch driving pulse to the common electrode 12 acting as the touch driving electrode and for applying a common voltage in a period during which no touch driving pulse is applied.

Figure 2:
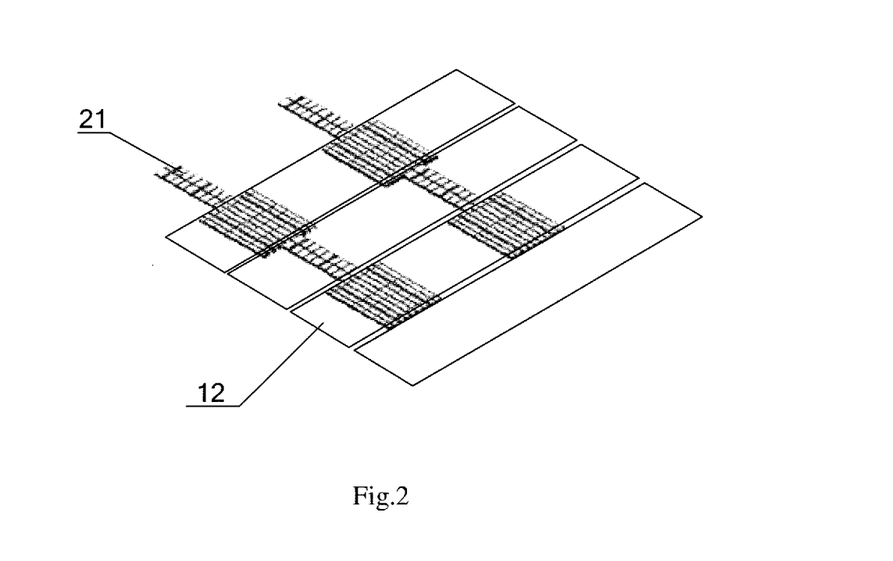
FIG. 2 is an exemplary view illustrating a structure of ouch driving electrodes and touch sensing electrodes according to the embodiments of the present disclosure.

As illustrated in FIG. 2, in order to realize a touch control function, the touch display screen is generally provided with the touch driving electrodes and touch sensing electrodes, and the touch sensing electrodes 21 in the present embodiment are disposed on the color film substrate 20 generally. In particular, the touch sensing electrodes 21 should be located as closely as possible to a base of the color film substrate, for example, as illustrated in FIG. 1, the touch sensing electrodes 21 are located above a color film layer 22 in the color film substrate 20 and are disposed overlapping with the touch driving electrodes (which are implemented with the common electrodes 12 of strip shape). The common electrodes 12 may be disposed on the array substrate 10 in the present embodiment, such as in an Advanced Super Dimension Switch (ADS) mode or an In-Plane Switching (IPS) mode; further, the common electrodes 12 may also be disposed on the color film substrate 20, such as in a Twisted Nematic Liquid Crystal (TN) mode.

However, optionally, the driving circuit is disposed on the array substrate in consideration of a manufacture process, and therefore when the common electrodes 12 are disposed on the color film substrate 20, it is required that the touch driving electrodes (namely the common electrodes acting as the touch driving electrodes at the same time in the embodiments of the present disclosure) are led to the array substrate 10 by an inter-layer conductive ball disposed between the array substrate 10 and the color film substrate 20, and are connected to the driving circuit on the array substrate 10.

More particularly, as illustrated in FIG. 1 which shows an implementation of the present embodiment, the common electrodes 12 of strip shape are disposed on the array substrate 10 and particularly are located on a layer lower to the pixel electrodes 11, the touch driving electrodes (namely the common electrodes acting as the touch driving electrodes at the same time) and the touch sensing electrodes 21 are insulated from each other by liquid crystal and a cell gap, so no insulation layer is needed to be disposed between the touch driving electrodes and the touch sensing electrodes 21. In an example, the pixel electrode 11 is a slit electrode.

Of course, the common electrode 12 may also be disposed at a position closer to the liquid crystal, that is, the common electrode 12 may be located above the pixel electrodes 11, and at this time, the common electrodes are slit electrodes of strip shape.

Obviously, although the embodiment of the present disclosure takes the ADS mode as an example, the present disclosure has no limitations on a display mode of the touch display screen.

Figure 3:
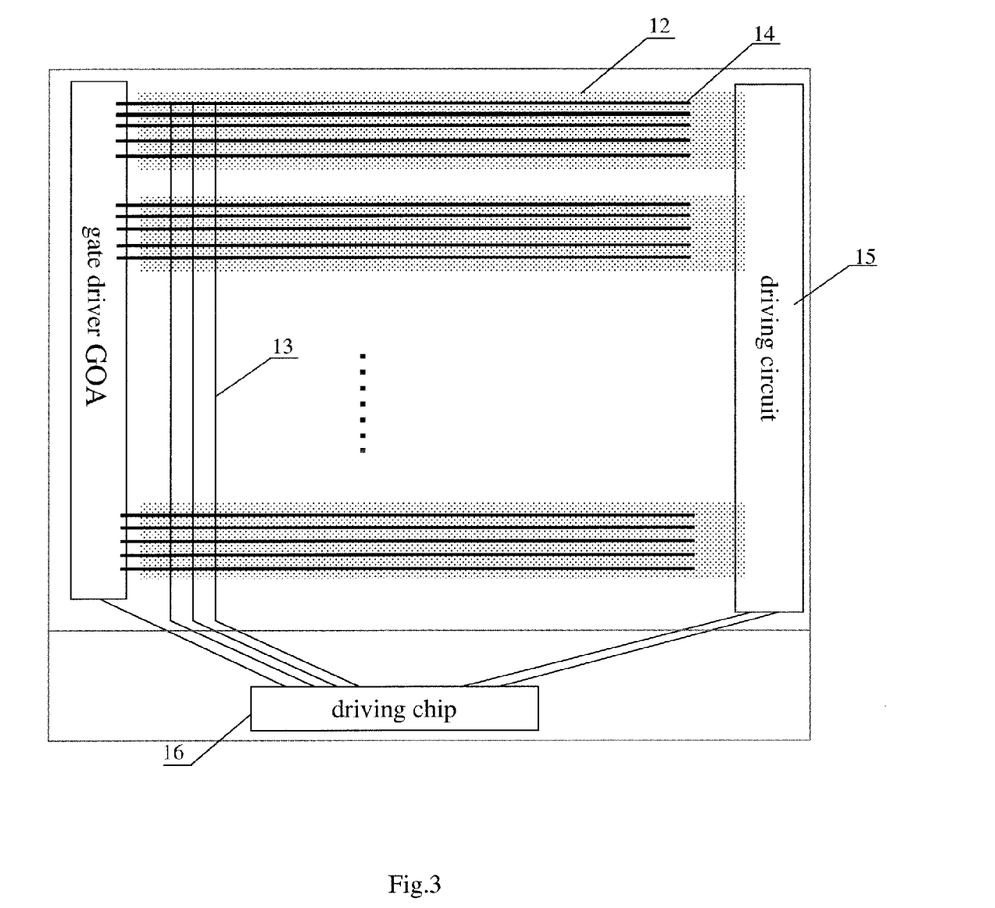
FIG. 3 is an exemplary view illustrating a structure of an array substrate in the touch display screen according to the embodiments of the present disclosure.

In the embodiment of the present disclosure, the common electrode is configured as the strip, one row of display units on the touch display screen may correspond to one row of the pixel electrodes one to one; as an alternative, one or more rows of display units in the touch display screen correspond to one common electrode 12, as illustrated in FIG. 3, that is, one touch driving electrode is arranged so as to correspond to the one or more rows of pixel electrodes.

Furthermore, it should be noted that the embodiment of the present disclosure may select all of the common electrodes to act as the touch driving electrodes; or may also select one or more of the common electrodes to act as the touch driving electrodes.

With the touch display screen according to the embodiments of the present disclosure, the common electrodes are configured to be strip-shaped, a part or all of the common electrodes are selected as the touch driving electrodes, and the driving circuit connected with the touch driving electrodes (the common electrodes acting as the touch driving electrodes) not only can apply the touch driving pulses to the touch driving electrodes, but also can apply the common voltage during the period in which no touch driving pulse is applied. For any one common electrode acting as the touch driving electrode, except for a duration for the touch driving pulse in a time period for displaying a frame of picture, the remaining is a time period for maintaining the common voltage. Therefore the duration for the touch driving pulse can be extended, so that the report rate of the touch display screen increases.

Further, in order to implement a touch display function, the touch display screen requires at least five paths of signals: a source signal, a gate signal and a common voltage (Vcom signal) for realizing a display function, and the touch driving signal (TX signal) and a sensing signal (RX signal) for realizing a touch function. In an example, the gate signal is provided by a GOA (Gate On Array) unit integrated on the array substrate 10 while timing signals for driving the GOA unit and so on are provided by a driving chip (driving IC) attached additionally, and other signals required in the touch display screen are also provided by the driving IC. Therefore, although the existing touch display screen can realize the touch display function, the number of signals required to be outputted from the driving IC is too large, the driving IC has a complex manufacture process and a high cost, which does not meet requirements of light-weight and narrower bezel for the touch display screen desired by consumers. The touch display screen according to the embodiment of the present disclosure can be provided with the common voltage and the touch driving signal by the driving circuit disposed on the array substrate, so that the number of the output signals from the driving chip (IC) is decreased and a complexity in manufacturing the driving chip is reduced, which reduces the cost, and meanwhile a thickness of a panel and a width of the bezel of the touch display screen can be decreased.

The GOA (Gate on Array) is a design with a high technique level in a TFT-LCD field, and its basic concept is to integrate a gate driver of a liquid crystal panel (LCD Panel) on the array substrate so as to perform a scan driving on the panel.

In an implementation of the present embodiment, the touch display screen comprises the array substrate as illustrated in FIG. 3, on which gate lines 14 are arranged in a horizontal direction while data lines 13 are arranged in a vertical direction, the gate lines 14 and the data lines 13 crisscross and divide the array substrate 10 into a plurality of display units (pixels), the touch driving electrodes (which is implemented by the common electrodes 12 of the strip shape) are in parallel to the gate lines, and a plurality of rows of display units correspond to one touch driving electrode.

The common electrodes 12 acting as the touch driving electrodes are connected with the driving circuit 15, and the driving circuit 15 may be disposed on the array substrate 10, and more particularly, as illustrated in FIG. 3, the driving circuit 15 and the GOA unit may be disposed at two bezel shielding areas, that is a left bezel shielding area and a right bezel shielding area, respectively, and a driving IC 16 for providing trigger signals to the driving circuit 15 and the GOA unit may be attached to a lower bezel (or a upper bezel) shielding area. As the array substrate is manufactured (an Array process), the driving circuit 15 may be formed simultaneously, which saves the cost.

Further, a configuration and a driving mode of the common electrodes which do not act as the touch driving electrodes are same as those as known, and details are omitted in the present embodiment. The common electrodes acting as the touch driving electrode are connected with the driving circuit 15, an the driving circuit 15 is used for applying the common voltage and the touch driving signals to the common electrodes acting as the touch driving electrodes.

The touch display screen according to the embodiments of the present disclosure can be provided with the common voltage and the touch driving signals by the driving circuit disposed on the array substrate, so that the number of output signals from the driving chip (IC) can be decreased and the complexity in manufacturing the driving chip is reduced, which reduces the cost, and meanwhile the thickness of the panel and the width of the bezel in the touch display screen can also be decreased.

In the present embodiment, the driving circuit is connected with the common electrodes acting as the touch driving electrodes, and is used for applying the touch driving pulses to the common electrodes acting as the touch driving electrodes and applying the common voltage in a period during which no touch driving pulse is applied. The embodiments of the present disclosure have no limitations on implementations of the driving circuit, which may be any implementation known well by those skilled in the art, and one implementation will be described below as an example of the present embodiment.

Figure 4:
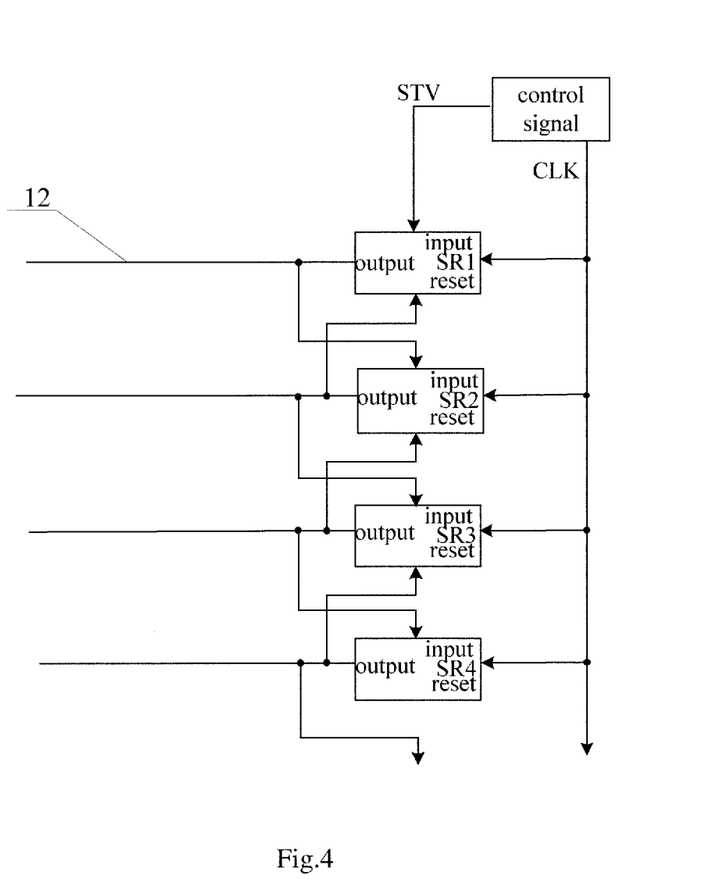
FIG. 4 is an exemplary view illustrating a structure of a driving circuit according to the embodiments of the present disclosure.

Optionally, as illustrated in FIG. 4, the driving circuit comprises a plurality of shift register units (SRI~SRN); an outputting terminal of each shift register is connected with one of the common electrodes 12 acting as the touch driving electrode; except for a first shift register SRI and a last shift register SRN, the outputting terminal of each of shift registers is connected with an inputting terminal of a subsequent shift register adjacent thereto and a reset signal inputting terminal of a previous shift register adjacent thereto; an inputting terminal of the first shift register is inputted into a frame start signal (STV), an outputting terminal of the first shift register is connected with an inputting terminal of a second shift register, and an outputting terminal of the last shift register is connected with a reset signal inputting terminal of a previous shift register adjacent thereto and its own reset signal inputting terminal; and a low voltage signal inputting terminal (VSS) of the each shift register is inputted into the common voltage.

Further, a clock signal inputting terminal of each shift register is inputted into a clock signal CLK, and the number of the clock signals has a relation to an internal structure of the shift register and there is no limitation on this.

The present embodiment has no limitations on the internal structure of the shift register, as long as the low voltage signal inputting terminal (VSS terminal) is inputted into the common voltage and the inputting terminal of the first shift register is inputted into the frame start signal (STV) as a touch scan initiation signal. Thereafter, an operational process of the driving circuit during different phases according to the embodiments of the present disclosure will be described by taking the shift register illustrated in FIG. 5(a) as an example.

Figure 5A:
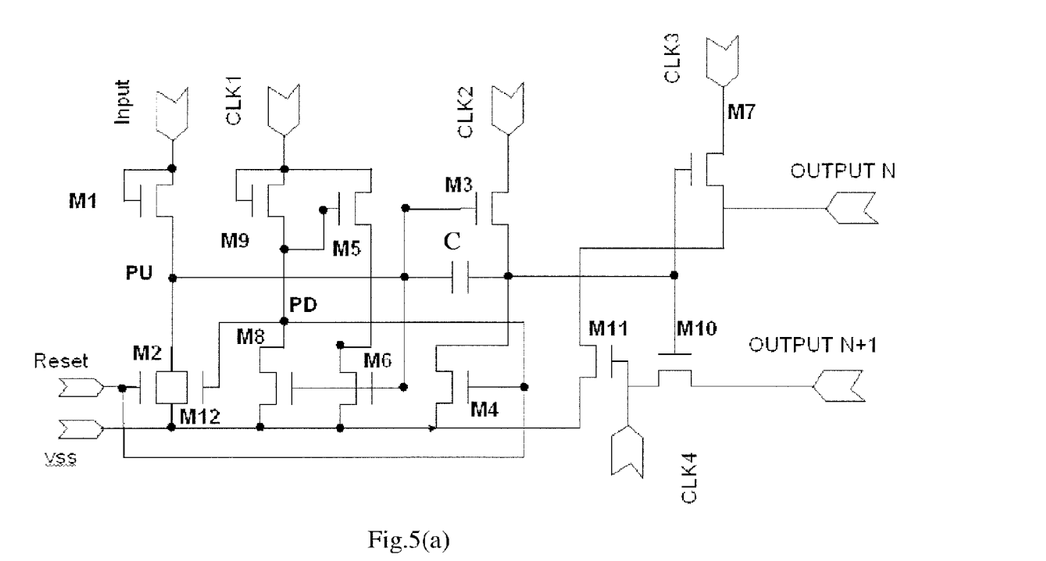
Figure 5B:
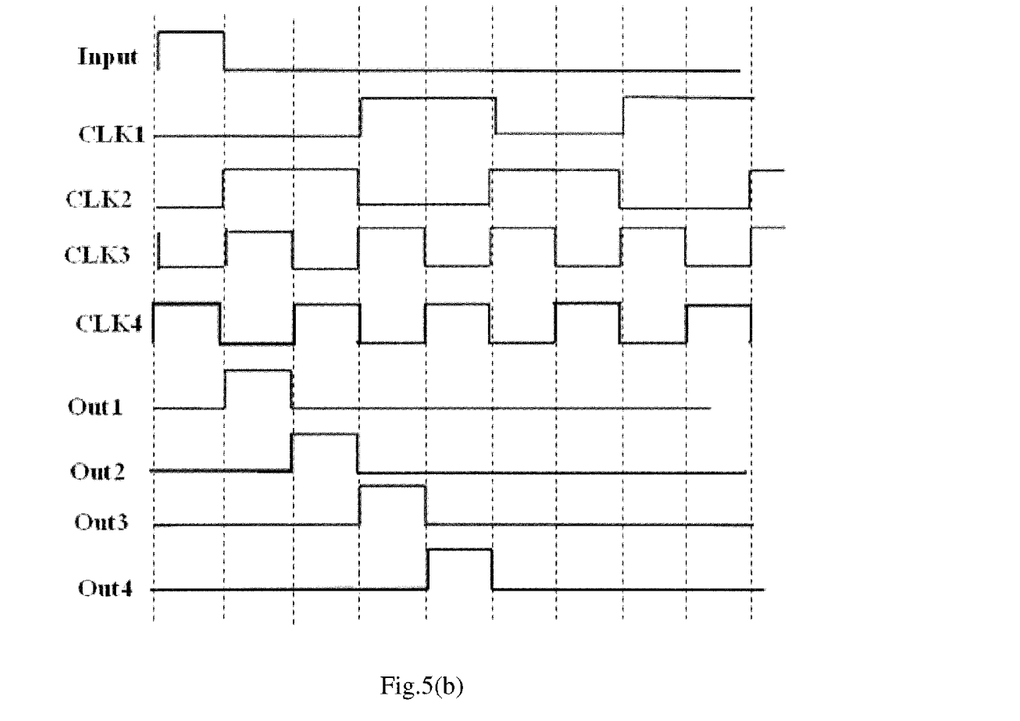

The clock signals CLK1~CLK4 are outputted according to a timing shown in FIG. 5(b). When an input signal (Input signal) of the shift register changes from low to high, that is, when an output signal from a previous row is high, this unit is charged, and a potential at a PU point is high after the charging is completed so that noises are eliminated. Further, when the CLK2 changes from low to high, the other side of a capacitor generates the output signal, and when the CLK3 is at a high level, a Nth row outputs the touch driving pulse; after the CLK4 changes from low to high and the CLK3 changes from high to low, the CLK4 pulls down the output from the Nth row through a thin film transistor M11, so the outputting of this row is completed, while a M10 operates and an outputting of a (N+1)th row starts. The output from the (N+1)th row is the Input signal for a (N+2)th row (that is, a signal inputted to an inputting terminal of the (N+2)th row of shift registers). An output of a next row, namely the (N+2)th row is a reset signal (Reset signal) for a previous unit. The Reset signal might discharge charges across the capacitor, so the output is a VSS, namely in a normal low signal state, that is, the common voltage is outputted, and so forth. Thus, the driving circuit outputs the touch driving pulse row by row and outputs the common voltage in a period during which no touch driving pulse is outputted.

It should be noted that: if the CLK2 terminal of the shift register in an odd row is connected with the CLK1 signal and its CLK1 terminal is connected with the CLK2 signal, the CLK2 terminal of the shift register in an even row is connected with the CLK2 signal and its CLK1 terminal is connected with the CLK1 signal; alternatively, if the CLK2 terminal of the shift register in the even row is connected with the CLK1 signal and its CLK1 terminal is connected with the CLK2 signal, the CLK2 terminal of the shift register in the odd row is connected with the CLK2 signal and its CLK1 terminal is connected with the CLK1 signal.

In the embodiments of the present disclosure, the shift register in the driving circuit may utilize an existing 4T1C model for a gate driver, and similar to the driving manner of a gate, the driving circuit may also be disposed on the array substrate so as to save a space of the bezel.

The embodiments of the present disclosure may dispose the driving circuit on the array substrate, and those skilled in the art generally refer to the driving circuit together with the existing gate driver on the array substrate as a GOA unit.

With the touch display screen according to the embodiments of the present disclosure, the number of output signals from the driving chip (IC) can be decreased and the complexity in manufacturing the driving chip is reduced, which reduces the cost, and meanwhile the thickness of the panel and the width of the bezel in the touch display screen can also be decreased.

Figure 6:
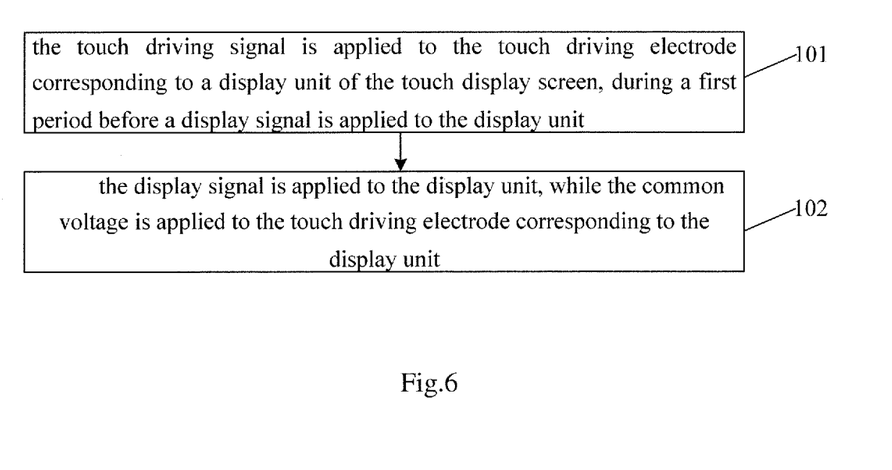
FIG. 6 is a flowchart of a driving method of the touch display screen according to the embodiments of the present disclosure.

Corresponding to the structure described above, the embodiments of the present disclosure further provide a driving method of a touch display screen, as illustrated in FIG. 6, and the method comprises:

at a step 101, the touch driving signal is applied to the touch driving electrode corresponding to a display unit of the touch display screen, during a first period before a display signal is applied to the display unit; and at a step 102, the display signal is applied to the display unit, while the common voltage is applied to the touch driving electrode corresponding to the display unit.

In the touch display screen according to the embodiments of the present disclosure, the common electrode is configured as a strip, a part or all of the common electrodes are selected to act as the touch driving electrodes, and the driving circuit connected with the touch driving electrodes (the common electrodes acting as the touch driving electrodes) not only can apply the common voltage to the touch driving electrodes, but also can apply the touch driving signal to the touch driving electrodes. During a short period (that is the first period in the present embodiment) before the pixel (display unit) is going to be charged, the driving circuit outputs the touch driving signals to the touch driving electrodes corresponding to the current row of pixels (display units), the touch sensing electrodes on one side of the color film substrate sense the signal, thus a touch addressing is implemented and the touch function is realized, and meanwhile the number of output signals from the driving IC is decreased and its cost is reduced. In an example, the touch driving electrodes are implemented by the common electrodes.

In particular, referring to FIG. 3, one detailed implementation of the above driving method is described as follows.

When one frame of display signal is applied, the touch driving signal is applied to the touch driving electrodes corresponding to a $1^{st}$~Kth rows of display units on the touch display screen one by one at first.

Next, starting from the $1^{st}$ row of display units of the touch display screen: when the display signal is applied to the Nth row of display units of the touch display screen, the common voltage is applied to the touch driving electrode corresponding to the Nth row of display units and at the same time the touch driving signal is applied to the touch driving electrode corresponding to the (N+K)th row of display units, and so forth, until the display signal is applied to the Kth row of display units from bottom of the touch display screen; when the display signal is applied to one of the last K rows of display units of the touch display screen, the common voltage is only applied to the touch driving electrodes corresponding to the display units; wherein the Nth row of display units and the (N+K)th row of display units do not correspond to a same touch driving electrode, both N and K are nature numbers, and N≥1, K≥1.

On the array substrate, most of the common electrodes are connected with a direct-current signal Vcom, that is, they are inputted into the common voltage, in order to ensure a normal display of a product, and only the common electrodes selected to act as the touch driving electrodes (the detailed number of rows thereof is determined depending on a design for the touch display screen, generally set as 15~25 rows) are driven by the driving circuit, such common electrodes (which act as the touch driving electrodes) not only can be applied the common voltage but also can be applied the touch driving signals. Of course, all of the common electrodes may be designed to be act as the touch driving electrodes.

Figure 7:
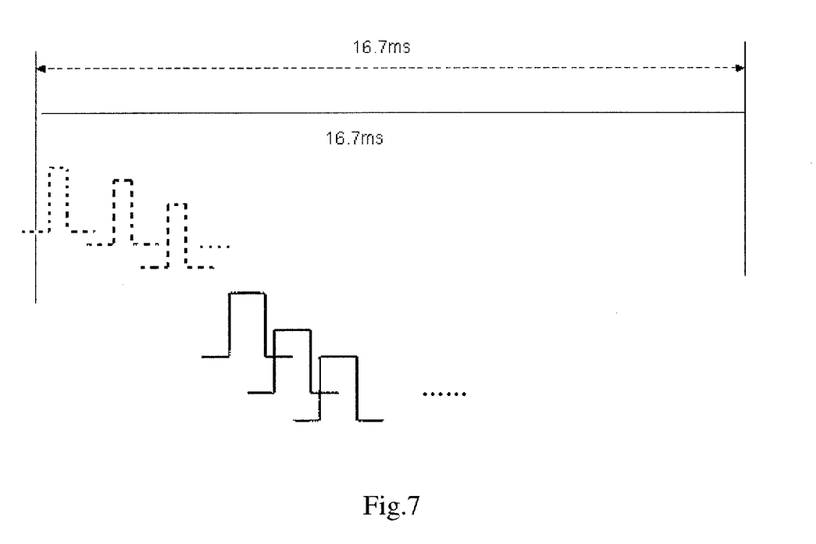
FIG. 7 is a timing diagram of the touch display screen according to the embodiments of the present disclosure.

Referring to FIG. 7 in which solid lines denote the gate driving signals and dotted lines denote the touch driving signals. To facilitate the understanding, K=1 in the following description. For a certain row of common electrodes (acting as the touch driving electrodes) driven by the driving circuit, a shift register in the driving circuit sets the driving circuit to output a pulse (for example, a pulse of +5V) when a previous row adjacent to the pixels corresponding to the row of common electrodes starts to be charged by the gate signal pulse, and the driving circuit outputs the common voltage (Vcom signal) after the charging of the previous row is completed and remains the Vcom signal until a next frame reaches, and so forth. Therefore, in the time period of one frame, the driving circuit outputs a pulse signal once on each common electrode wiring and outputs the Vcom signal during the remaining period to ensure the picture display.

Further, in the time period of one frame, the touch driving electrode on the array substrate outputs the touch driving signal, such as the pulse of +5V, through the shift register, the touch sensing electrode disposed on one side of the color film substrate senses the signal, thus the touch addressing is implemented and the In Cell touch control function is realized, and meanwhile the number of output signals from the driving IC is decreased and its cost is reduced.

According to the embodiments of the present disclosure, the Vcom signal of the (N+1)th row of display units is changed to a touch signal of +5V when the Nth row of display units are charged for displaying, and the Vcom signal is outputted when the charging of the Nth row of display units is completed and the (N+1)th row of display units will be charged for displaying in order to ensure the normal display. At this time, the first period in the present embodiment is a period during which the previous row of display units are charged for displaying.

Optionally, in the driving method, during the time period of one frame, the touch driving signal is applied to the touch driving electrode corresponding to any one row of display units once.

Optionally, in the driving method: after the common voltage is applied to the touch driving electrode corresponding to any one row of display units, the common voltage is maintained until the touch driving signal is applied; and after the touch driving signal is applied to the touch driving electrode corresponding to any one row of display units, the touch driving signal is maintained until the common voltage is applied.

As compared with the existing touch display screen, the touch display screen and the driving method thereof according to the embodiments of the present disclosure are mainly advantageous in two aspects.

Firstly, in the existing design for the In Cell touch display screen, the driving in time-division is adopted, for example, as illustrated in FIG. 8 in which a solid line denotes gate driving signals and a dotted line denotes touch driving signals, a product of 60 Hz is driven in time-division, so that a period about 12 ms is used for displaying and a period about 4 ms is used for performing the touch control function during a time period of one frame, 16.7 ms. The signals are changed, but human's eye can not perceive such change, so it is called as a time-division driving. However, instead of the time-division driving, in the touch display screen according to the embodiments of the present disclosure, the touch driving signals are outputted to the common electrodes which correspond to the row of pixels (display units) and act as the touch driving electrodes, in the short period before the row of pixels (display units) is going to be charged, which does not affect the display and can increase the report rate of the touch screen.

Secondly, in the existing design for the In Cell touch display screen, the touch driving signals (TX signals) and the sensing signals (RX signals) required for realizing the touch control function are provide by separate touch driving chips; while in the touch display screen according to the embodiments of the present disclosure, the TX signal is outputted by the driving circuit integrated on the array substrate, and the driving circuit provides a voltage (for example, a voltage about 5V) when the GOA unit outputs the gate scan signal, and the voltage of Vcom is maintained during a non-output process. Thus the number of the output signals from the driving chip (IC) is decreased and the complexity in manufacturing the driving chip is reduced, which reduces the cost, and meanwhile the thickness of a panel and the width of the bezel of the touch display screen can be decreased.

A manufacture of the touch display screen according to the embodiments of the present disclosure is different from that of the traditional ADS display screen. In a manufacture of the array substrate, it needs to make the entire ITO plane to be strip shape (slit) to form the common electrodes, as illustrated in FIG. 3

In a manufacture of the color film substrate, the touch sensing electrode should be manufactured first before a manufacture of a black matrix, and generally, a desired pattern is made by coating a metal film on a glass and then performing an exposure and an etching.

The present disclosure can decrease an influence of a blind loss in touch somewhat, so that the report rate is increased. For example, the known technique utilizes the time-division driving, such that a touch point could not be reported if a person makes a touch in a display phase during the time period of 12 ms for performing the display function, while the touch point in such a touch can be reported by the design according to the embodiments of the present disclosure.

Those ordinary skilled in the art can understand that all or part of the flows in the method according to the embodiments of the present disclosure may be accomplished by related hardware which is instructed by computer programs, and program may be stored in a computer readable storage medium and may comprise the flows of the embodiments for respective method above as executed. The storage medium may be a magnetic disk, an optical disc, a Read-Only Memory (ROM) or a Random Access Memory (RAM), etc.

The above descriptions only illustrate the specific embodiments of the present invention, and the protection scope of the present invention is not limited to this. Given the teaching as disclosed herein, variations or substitutions, which can easily occur to any skilled pertaining to the art, should be covered by the protection scope of the present invention. Thus, the protection scope of the present invention is defined by the claims.

What is claimed is:

1. A touch display screen comprising a color film substrate and an array substrate, wherein common electrodes, which have a shape of strip, are disposed on the color film substrate or the array substrate, and one or more of the common electrodes act as touch driving electrodes of the touch display screen; the touch display screen further comprises:
   a driving circuit, connected with the common electrodes acting as the touch driving electrodes, configured to apply touch driving pulses to the common electrodes acting as the touch driving electrodes and to apply a common voltage in a period during which no touch driving pulse is applied;
   wherein, the driving circuit comprises a plurality of shift registers connected in series;
   an outputting terminal of each of shift registers is connected with one of the common electrodes acting as the touch driving electrodes; and an inputting terminal of a first shift register is configured to input a frame start signal as a touch scan initiation signal.

2. The touch display screen of claim 1, wherein
except for the first shift register and a last shift register, the outputting terminal of each of shift registers is connected with an inputting terminal of a subsequent shift register adjacent thereto and a reset signal inputting terminal of a previous shift register adjacent thereto, an outputting terminal of the first shift register is connected with an inputting terminal of a second shift register, and an outputting terminal of the last shift register is connected with a reset signal inputting terminal of a previous shift register adjacent thereto and its own reset signal inputting terminal, and a low voltage signal inputting terminal of each of shift registers is configured to input the common voltage.

3. The touch display screen of claim 2, further comprises: touch sensing electrodes disposed on the color film substrate.

4. The touch display screen of claim 2, wherein the touch display screen comprises a plurality of display units, and one of the common electrodes corresponds to one or more rows of the display units.

5. The touch display screen of claim 2, wherein the common electrodes are disposed on the array substrate.

6. The touch display screen of claim 2, wherein the common electrodes are slit electrodes.

7. The touch display screen of claim 2, wherein the driving circuit is disposed on the array substrate.

8. The touch display screen of claim 1, further comprises: touch sensing electrodes disposed on the color film substrate.

9. The touch display screen of claim 1, wherein the touch display screen comprises a plurality of display units, and one of the common electrodes corresponds to one or more rows of the display units.

10. The touch display screen of claim 1, wherein the common electrodes are disposed on the array substrate.

11. The touch display screen of claim 1, wherein the common electrodes are slit electrodes.

12. The touch display screen of claim 1, wherein the driving circuit is disposed on the array substrate.

13. A driving method of a touch display screen, comprising:

Applying, by a driving circuit, a touch driving signal to a touch driving electrode corresponding to a display unit of the touch display screen, during a first period before a display signal is applied to the display unit; and applying the display signal to the display unit, and applying a common voltage, by the driving circuit, to the touch driving electrode corresponding to the display unit simultaneously;

wherein, the driving circuit comprises a plurality of shift registers connected in series;

an outputting terminal of each of shift registers is connected with one of common electrodes acting as the touch driving electrodes; and an inputting terminal of a first shift register is configured to input a frame start signal as a touch scan initiation signal.

14. The driving method of claim 13, wherein, when a frame of display signal is applied, the touch driving signal is applied to the touch driving electrodes corresponding to $1^{st}$~Kth rows of display units of the touch display screen one by one at first;

next, starting from the $1^{st}$ row of display units of the touch display screen: when the display signal is applied to an Nth row of display units of the touch display screen, the common voltage is applied to the touch driving electrode corresponding to the Nth row of display units and at the same time the touch driving signal is applied to the touch driving electrode corresponding to a (N+K)th row of display units, and so forth, until the display signal is applied to the Kth row of display units from the bottom of the touch display screen; when the display signal is applied to one of last K rows of display units of the touch display screen, the common voltage is only applied to the touch driving electrodes corresponding to the display units;

wherein the Nth row of display units and the (N+K)th row of display units do not correspond to a same touch driving electrode, both N and K are nature numbers, and $N \geq 1$, $K \geq 1$.

15. The driving method of claim 14, wherein during a time period of one frame, the touch driving signal is applied to the touch driving electrode corresponding to any one row of display units once.

16. The driving method of claim 14, wherein, during the time period of one frame, after the common voltage is applied to the touch driving electrode corresponding to any one row of display units, the common voltage is maintained until the touch driving signal is applied; and after the touch driving signal is applied to the touch driving electrode corresponding to any one row of display units, the touch driving signal is maintained until the common voltage is applied.

17. The driving method of claim 13, wherein during a time period of one frame, the touch driving signal is applied to the touch driving electrode corresponding to any one row of display units once.

18. The driving method of claim 13, wherein, during the time period of one frame, after the common voltage is applied to the touch driving electrode corresponding to any one row of display units, the common voltage is maintained until the touch driving signal is applied; and after the touch driving signal is applied to the touch driving electrode corresponding to any one row of display units, the touch driving signal is maintained until the common voltage is applied.

* * * * *